2 Sheets—Sheet 1.
J. T. COWLEY.
Assignor, by mesne assignments, to the LAMSON CONSOLIDATED STORE SERVICE COMPANY.
STORE SERVICE APPARATUS.
No. 11,049. Reissued Dec. 24, 1889.
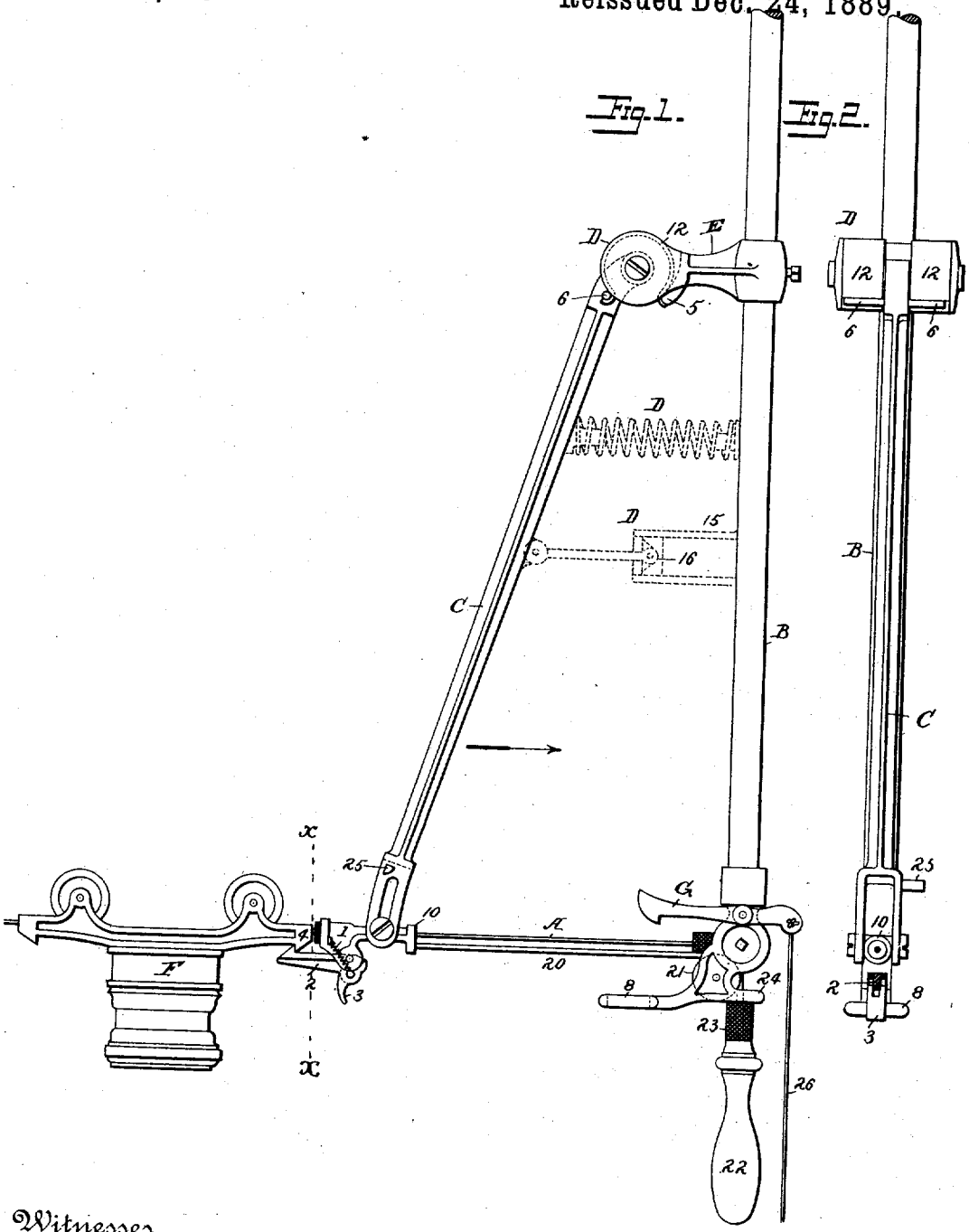
Witnesses
Jno. G. Hinkel, Jr.
Georgia P. Kramer.
Inventor
James T. Cowley,
By his Attorneys
Foster & Freeman
N. PETERS, Photo-Lithographer, Washington, D. C.

2 Sheets—Sheet 2.

J. T. COWLEY.

Assignor, by mesne assignments, to the LAMSON CONSOLIDATED STORE SERVICE COMPANY.

STORE SERVICE APPARATUS.

No. 11,049. Reissued Dec. 24, 1889.

Witnesses
Jno. G. Hinkel Jr.
Georgia P. Kramer.

Inventor
James T. Cowley,
By his Attorneys
Foster & Freeman

N. PETERS, Photo-Lithographer, Washington, D. C.

UNITED STATES PATENT OFFICE.

JAMES T. COWLEY, OF LOWELL, MASSACHUSETTS, ASSIGNOR, BY MESNE ASSIGNMENTS, TO THE LAMSON CONSOLIDATED STORE SERVICE COMPANY, OF NEWARK, NEW JERSEY, AND BOSTON, MASSACHUSETTS.

STORE-SERVICE APPARATUS.

SPECIFICATION forming part of Reissued Letters Patent No. 11,049, dated December 24, 1889.

Original No. 414,107, dated October 29, 1889. Application for reissue filed November 20, 1889. Serial No. 331,026.

*To all whom it may concern:*

Be it known that I, JAMES T. COWLEY, a citizen of the United States, and a resident of Lowell, in the county of Middlesex and State of Massachusetts, have invented certain new and useful Improvements in Store-Service Apparatus, of which the following is a specification.

The present invention relates to certain improvements in store-service apparatus wherein the carriage bearing the cash or bundle receptacle is impelled over a track or way by impact given it at a station or cashier's desk.

The present invention has for its object, among other things, the provision of means for producing the impact necessary to impel the carriage over the way, whereby the fixed arm employed in many forms of impelling devices to which this improvement is most nearly connected, and overhanging and extending parallel with the way for a short distance, may be dispensed with; and it consists in the novel construction and arrangement of parts too fully hereinafter set forth to need preliminary description.

Figure 4:
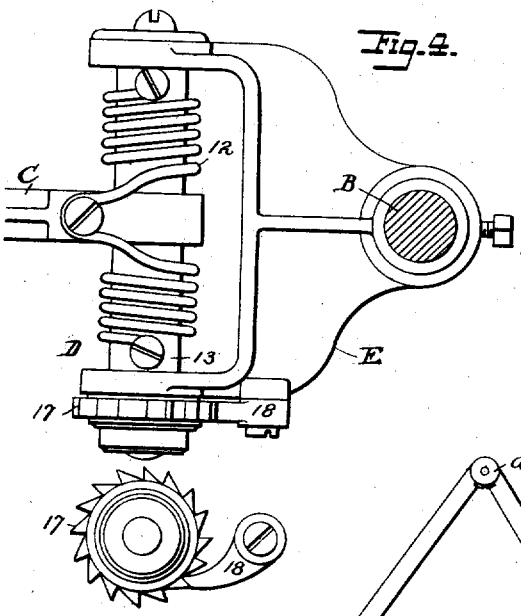
Figure 3:
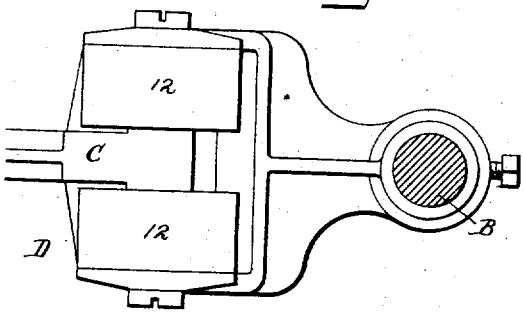
Figure 5:
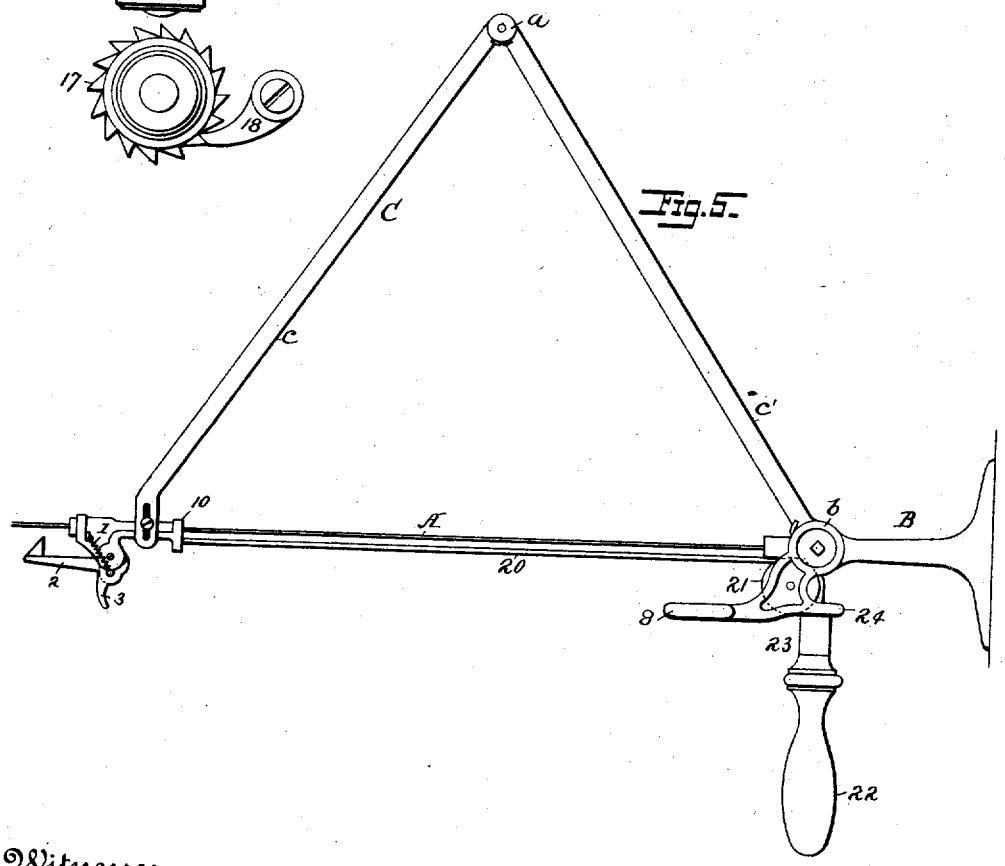

In the drawings, Figure 1 is a side elevation of an apparatus embodying the present improvements. Fig. 2 is an end elevation thereof, partly in section, taken on the line *x x* of Fig. 1. Fig. 3 is a plan view of the pivot of the impelling-lever. Fig. 4 is an elevation plan of a modification of said pivot, and Fig. 5 is a modified form of the propelling-arm.

Referring to Figs. 1, 2, and 3, it will be understood that B represents a bracket of any required form, usually secured to and depending from the ceiling of a store, and A the usual track or way, inclined or horizontal. As shown, it is a horizontal wire stretched taut between terminal supports, and may constitute one of a series of ways extending from a central desk or station to different counters, stations, or locations, as usual.

At one or both ends of each way there is combined a propelling device, whereby the cashier or salesman may readily impart to the car or carriage from his station adjacent the way an impetus sufficient to impel the car to the opposite end of or other position on the way, from which end or position it may be sent farther on or returned, when desired, by like means or by gravity or otherwise. The propelling device herein consists, essentially, of a pivoted lever or arm C, the free end of which is adapted to be vibrated in proximity to and in the direction of the way and connected with an impelling device D, adapted to exert sufficient force upon the arm to propel the car against which it acts. As shown, the lever or arm C is pivoted to a bracket or extension E, projecting from the bracket B. The free end of the arm is loosely connected to a sleeve or slide 10, which is supported upon the way A and adapted to slide thereon, and this affords a convenient guide for this end of the arm C and a stop for the car. This end of the arm is also provided and preferably mounted on the slide with a catch-arm 2, that is adapted to automatically engage the end 4 of a car or carriage F as it arrives in contact with the end of the arm C, and by which the arm and car are temporarily coupled together, so that the car is caused to travel for a short distance with the arm as it is vibrated, as will hereinafter appear.

The means for imparting an impulse to the arm, and through it to the car upon the way, may be of a variety of forms, and modifications thereof will occur to any one familiar with this art. Thus, for instance, said impelling means may take the form of a pair of stiff springs 12, (see Figs. 1, 2, and 3,) which partially surround the pivoted end of the lever and bear one end against a shoulder 5 on the bracket E and the other against a stud or projection 6 on the arm C.

As shown in Fig. 4, the impelling means D consists of a single spring 12, connected at its center to the arm C at 6, and its ends coiled on each side thereof on its pivotal stud 13 and secured thereto, as shown. The end of the stud may be provided with a ratchet 17, that is engaged by a pawl 8, by rotating which ratchet the tension of the spring may be increased or diminished. Again, the impelling means may be located in any position found best suited in practice to the purposes desired. Thus in Fig. 1 is shown in dotted lines a spring extending between the arm C and bracket B. So, too, instead of a spring, the device may consist, as shown in dotted lines in said figure, of a cylinder 15, the open end of which is adapted to receive a piston 16, which piston, as the arm is moved in the direction of the arrow, will compress the air or other elastic fluid in the cylinder, and when permitted to do so will give a sudden forward impulse to the arm.

The catch-arm 2, coupling the car and arm C, holds them connected until a sudden forward movement is imparted to the arm, when the catch is withdrawn and the car is released to move forward on the way freely under the impulse received. The construction and operation of this catch and its tripping device or stop 8 form no part of the present application, as the same are fully set forth and claimed in patent granted to me on October 16, 1888, No. 391,027, to which reference may be had.

The vibration of the arm C may be effected by means of a retractor consisting of a cord 20, attached at one end to the arm, or, as shown, to its slide 10, and passing over a pulley 21, mounted in the bracket B and having a handle 22. By grasping the handle and pulling it down the salesman may vibrate the arm in the direction of the arrow against the pressure of the propelling device D, storing up power which, when the handle is suddenly released, will project the arm C forward with sufficient energy to cause the car to be propelled freely on the way. The limit of the forward propulsive movement of the arm C is best had by the cushioned end 23 of the handle striking against a stop 24, formed on the end of the bracket; but it may be secured in any other way found most desirable in practice.

In order to hold the arm C in its rearward position, ready to propel the car in front of it, there may be provided a catch G, (see Fig. 1,) adapted to engage with a stud 25 upon the arm, which, when tripped by pulling upon a cord 26, will release the arm in the same manner as by suddenly releasing the hold upon the handle 22. The propelling means may have the effect to hold the arm in its forward position, so that its free end acts as a buffer, against which the car will strike and by which its movement will be suitably arrested.

The position of the arm C is not important, so long as its free end is brought adjacent to the way, so as to act against the end of the car, and, instead of being a single arm, it may be a divided one, as shown in Fig. 5, wherein it consists of members *c c'*, hinged together at *a*, and the latter member pivoted at *b* to the bracket B and provided in any suitable manner with the propelling means heretofore described, whereby it is projected forward upon releasing the hold on the cord 20 or its handle.

Instead of the flat spring employed for holding the catch-arm 2 in the two positions, as set forth in my aforesaid application, I may substitute therefor a spiral spring 1, one end secured to the slide 10 and the other to the pivoted dog 3 in such manner that it will exert its force upon the catch-arm both when it is in its normal position, as shown, and when in its open position.

I do not here claim the arm C engaging with a stud on the side, this being claimed in Letters Patent No. 395,316, granted to me January 1, 1889.

Without limiting myself to the specific construction and arrangement shown, what I claim is—

1. In a store-service apparatus, the combination, with a way and a car supported by said way, of a pivoted propelling-arm carrying a catch for engagement with the car and adapted to impart a propulsive force to the car.

2. In a store-service apparatus, the combination, with the way and a car supported thereon, of a pivoted propelling-arm carrying a catch for engagement with the car, and a propelling-block embracing the way and held by the lower end of the propelling-arm.

3. In a store-service apparatus, the combination, with a way and a car supported by said way, of a pivoted spring-actuated propelling-arm adapted to impart a propulsive force to the car, a catch for coupling the arm and car together, and a retractor for simultaneously drawing back the arm and car previous to propelling the latter over the way, substantially as described.

4. In a store-service apparatus, the combination, with a way and a car supported by said way, of a pivoted spring-actuated propelling-arm carrying a catch for engagement with the car and adapted to impart a propulsive force to the car, substantially as described.

5. In a store-service apparatus, the combination, with a way and a car supported by said way, of a pivoted spring-actuated propelling-arm carrying a slide running on said way, against which slide the car abuts, said arm being adapted to impart a propulsive force to the car, a catch for coupling the slide and car together, and a retractor for simultaneously drawing back the arm and car previous to propelling the latter over the way, as set forth.

6. In a store-service apparatus, the combination, with a way and a car supported by said way, of a pivoted spring-actuated propelling-arm carrying a slide mounted on the way, said slide having a catch for engagement with the car, and said arm adapted to impart a propulsive force to the car, substantially as described.

7. In a store-service apparatus, the combination of a way, a car supported by said way, a pivoted spring-actuated propelling-arm adapted to impart a propulsive movement to the car, a catch for coupling the arm and car together, a catch for temporarily holding said arm in its retracted position, and a retractor for simultaneously drawing back the arm and car previous to propelling the latter over the way, as set forth.

8. In a store-service apparatus, the combination of a way, a car supported by said way, a pivoted propelling-arm, and an impelling device by which the arm is vibrated in one direction to impart a propulsive movement to the car, a catch for coupling the arm and car together, and a retractor for simultaneously drawing back the arm and car previous to propelling the latter over the way, as set forth.

9. In a store-service apparatus, the combination of a way, a car supported by said way, a pivoted propelling-arm, and a spring by which the arm is vibrated in one direction to impart a propulsive movement to the car, a catch for coupling the arm and car together, and a retractor, whereby the arm and car are simultaneously retracted previous to propelling the car over the way, as set forth.

10. The combination, with the way and a car running on said way, of a pivoted arm C, carrying at its free end a slide 10, mounted on the way and having a pivoted catch-arm for engagement with the car, a cord extending in position to be grasped by the attendant and adapted to vibrate the arm in one direction, and an impelling means for exerting energy upon said arm, substantially as described.

11. The combination, with the way and a car running on said way, of a pivoted arm C, carrying at its free end a slide 10, mounted on the way and having a pivoted catch-arm for engagement with the car, a cord extending in position to be grasped by the attendant and adapted to vibrate the arm in one direction, a catch for holding the arm in its retracted position, and an impelling means for exerting energy upon said arm, substantially as described.

12. In a store-service apparatus, the combination, with a way and car supported by said way and adapted to travel thereon, of a pivoted spring-actuated arm adapted to act as a buffer to arrest the momentum of the car and to impart a propulsive force to the car, a catch 2 for holding the car in connection with the arm, and a tripper for releasing the catch, whereby the car is impelled over the way, substantially as described.

13. In a store-service apparatus, the combination, with a way and a car supported by said way and adapted to travel thereon, of a pivoted spring-actuated arm adapted to act as a buffer to arrest the momentum of the car and to impart a propulsive impulse to the car, a catch for holding the arm and car together, a tripper for releasing the car from the arm, and a second catch for holding the arm and car in their rearward position, substantially as described.

14. In a store-service apparatus, the combination of a way, a car traveling on said way, a spring-actuated arm pivotally mounted at one end, its other or free end adapted to be vibrated in the direction of the way to impart a propulsive impulse to the car and to act as a buffer to arrest the momentum of the car, a catch 2 to hold the car in connection with and in position to be acted upon by said arm, and a tripper for releasing the car upon the propulsive movement of the arm, substantially as set forth.

In testimony whereof I have signed my name to this specification in the presence of two subscribing witnesses.

JAMES T. COWLEY.

Witnesses:
CHARLES E. FOSTER,
W. S. MCARTHUR.